G. B. HAINES.
VACUUMIZING APPARATUS.
APPLICATION FILED APR. 7, 1920.

1,395,915.

Patented Nov. 1, 1921.

Inventor:
George B. Haines
by  Attys

UNITED STATES PATENT OFFICE.

GEORGE B. HAINES, OF CHICAGO, ILLINOIS.

VACUUMIZING APPARATUS.

1,395,915.      Specification of Letters Patent.      Patented Nov. 1, 1921.

Application filed April 7, 1920. Serial No. 371,835.

*To all whom it may concern:*

Be it known that I, GEORGE B. HAINES, a citizen of the United States, residing at Chicago, in the county of Cook and State of Illinois, have invented certain new and useful Improvements in Vacuumizing Apparatus, of which the following is a specification.

One feature of the invention has to do with the provision of suitable means for establishing in a closed space, such as a can, a high degree of vacuum in a very quick manner, and for sealing the opening through which the air is exhausted in the vacuumizing process. Ordinarily this sealing function is accomplished by soldering or otherwise closing the opening through which the air was exhausted, and such operation must of necessity be conducted under a vacuum. One of the features of the present invention relates to the provision of greatly improved means, by the use of which this soldering operation may be performed in a very accurate and simple manner. In this connection, one of the objects of the invention is to provide an arrangement whereby the soldering heat may be electrically generated, the current being applied through an electrode or the like which may be moved around into the exact desired position so as to apply the current and heat to the best advantage.

Other objects and uses of the invention will appear from a detailed description of the same, which consists in the features of construction and combinations of parts hereinafter described and claimed.

Figure 1:
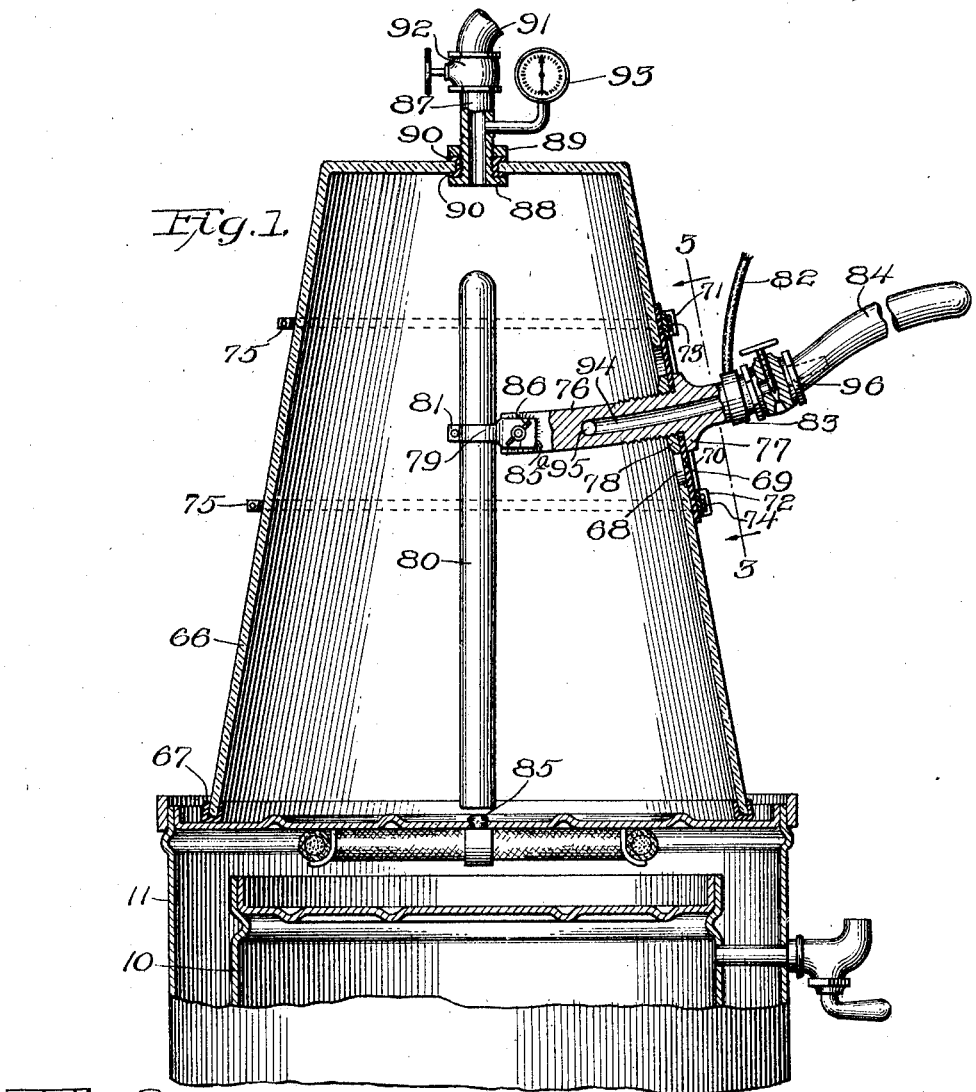
Figure 1 shows a fragmentary sectional view of the end portion of an inverted can having applied thereto a vacuumizer embodying certain of the features of the present invention, the same being shown in position ready to seal the opening after the establishment of the vacuum.
Figure 2:
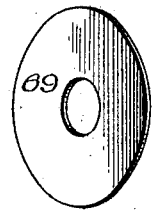
Fig. 2 shows a perspective view of the rubber or other flexible disk.
Figure 3:
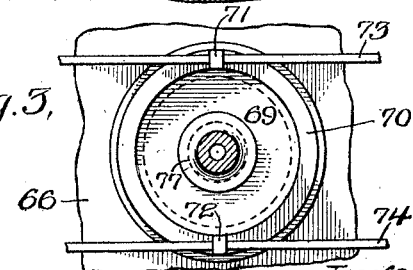
Fig. 3 shows a fragmentary detail view, taken on the line 3—3 of Fig. 1, looking in the direction of the arrows.

Referring now to Figs. 1, 2 and 3, I will describe a simple form of device for vacuumizing cans. For purposes of convenience in illustration, I have shown this device as applied to the bottom sheet of an inverted container which is to be vacuumized.

The vacuumizing device comprises the jar of glass or other material 66, the lower edge of which is provided with a rubber gasket 67 so that it may seat uniformly and in an air-tight manner against the surface of the sheet. At one point in this jar 66 there is provided a perforation 68, which is closed by a flexible disk of rubber, or the like, 69. This disk is held in an air tight manner against the jar and around the opening 68, as by means of a band or collar 70 having eyelets 71 and 72. The tie bands 73 and 74 pass through the eyelets 71 and 72 and around the jar to the opposite side; and they may be tightened in any suitable manner, as by the use of bolts 75.

A nipple or the like, 76, passes through the disk 69, having a collar 77 adapted to engage the outer face of the disk; and a nut 78 may be threaded onto the inner portion of the nipple and against the inside face of the disk. The arrangement provides an airtight connection between the disk and nipple. The inner end of the nipple carries a clip 79 to which may be connected an electrode 80 of carbon or the like, the clip 79 being preferably split and provided with a retainer 81 so that the electrode may be adjusted to the desired position in the clip.

An electric wire or cable 82 connects to the outer end of the nipple, as by means of a sleeve 83, so as to establish an electrical connection to the electrode. The other electrical terminal is connected to the can in any suitable manner, as, for example, by standing the same upon an electrified table or sheet.

A handle 84, of wood or the like, is conveniently attached to the outer end of the nipple so that the nipple can be moved about, owing to the flexibility of the disk 69. Sufficient flexibility is thus provided to enable the operator to bring the lower end of the electrode into the exact position desired in order to make contact with a drop or bead of solder or the like, 85, located over or adjacent to the perforation in the sheet 32 of the can. By proper manipulation of the handle 84 contact may be established and the solder melted either by the flow of current or the establishment of an arc. Owing to the flexibility of the disk 69 it is possible to secure a very accurate operation, with the result that the efficiency of the operators is very greatly increased and the quality of the work improved. By the use of this flexible connection, furthermore, it is unnecessary to secure an exact centering of the jar 66, thus making it possible to still further expedite the work.

If desired, the clip 79 may be pivotally mounted on the inner end of the nipple 76, said inner end being corrugated or roughened as shown at 85ª, so that upon tightening up a wing nut or the like, 86, the clip may be secured to the nipple in any desired position of adjustment.

The contents of the jar 66 and of the space between the walls of the can may be vacuumized through any suitable connection to the jar. For example, a nipple 87 may be passed through the upper portion of the jar, said nipple having a flange 88 on its inner end and a lock nut 89 on its projecting portion, so that upon tightening up said lock nut suitable gaskets or the like, 90, will be compressed against the jar to establish an air-tight connection. A pipe 91 leads from the nipple to a suitable exhausting machine or container, a valve 92 being provided for controlling the exhausting action. Ordinarily it will be desirable to place a gage 93 in communication with the nipple 87 so as to indicate the amount of vacuum or tenuity existing within the can; and when such a gage is used it will also indicate the relative tightness of the can, because by closing the valve 92 after the vacuum has been established the gage should remain at the vacuum indication originally created.

After the completion of the vacuumizing and sealing operations, it is desired to break the vacuum within the jar 66 so as to make it possible to easily remove said jar from the can. For this purpose I have illustrated a passage 94 extending through the nipple 76 and having an opening 95 at its inner end in communication with the interior of the jar, and having its outer end in communication with the atmosphere under control of a valve 96. Said valve should remain closed during the vacuumizing and sealing operations and after the valve 92 has been closed the valve 96 may be opened.

The pipe 91 leads to a suitable exhausting machine or container, and the valve 92 controls the communication of the jar with such machine or container. In some cases it will be very desirable to make use of a container which in turn is connected with suitable exhausting apparatus so that said container will directly receive the air exhausted from the can, which air will afterward be drawn from the container by the exhausting machine. This arrangement will present the advantge that the exhaustion of the air from the can will take place almost instantly in case the container be of sufficient capacity to receive the air from the can without too great a rise of pressure, and therefore be capable of so receiving the air from the container in sufficient tenuity to develop the desired vacuum within the can.

The above action may be best understood by citing an example. For example, suppose the vacuum can has a volume of 2,000 cubic inches, including the volume of the jar and immediately adjacent parts. This volume of 2,000 cubic inches will then be the volume from which the air must be drawn into the container. If said container be of say 4 feet diameter, and 5 feet height, it will have a volume of about 108,000 cubic inches. If it be initially under a vacuum of, say 28 inches of mercury, the air coming from the can and jar will expand into a total volume of 108,000 plus 2,500 cubic inches, or 110,500 cubic inches. The tenuity of the vacuum will therefore be reduced from 28 inches in the ratio which 110,500 bears to 108,000, or to a vacuum of 27.36 inches. From the above cited case it will be evident that by the use of a relatively large container it is possible to insure the immediate creation of the desired vacuum in the can, thereby avoiding the large delays which would otherwise be necessary while awaiting the vacuumizing of the can to the desired tenuity.

Of course, by the use of an exhauster in conjunction with the container, so that the air is being constantly withdrawn from the container, the vacuum will be maintained therein, and the container will be at all times ready for the operation of vacuumizing a new can. With this arrangement it is also possible to use a single centrally located container for serving a number of vacuumizing devices, so that a single central vacuumizing plant may be made to serve a number of vacuumizers. In such case the capacity of the exhauster need be only sufficient to withdraw within a given length of time, the air delivered during that time by the several cans vacuumized during that time. Thus the exhauster may be made to work always at maximum capacity, and therefore it may be made of minimum size and cost.

While I have herein shown and described only certain embodiments of my invention still I do not limit myself to the same except as I may do so in the claims.

I claim:

1. An aparatus for vacuumizing and sealing cans and the like comprising, in combination a glass jar having an opening in its side wall, a flexible disk extending over said opening, means for clamping the peripheral portion of said disk against the outside face of the jar around the opening in air-tight manner, a nipple extending through the disk, a flange on the nipple in contact with one face of the disk, a nut threaded onto the nipple and engaging the other face of the disk, an electrode clip pivotally mounted on the inner end of the nipple, means for securing said clip in a given position of adjustment, means for adjustably securing an electrode to said clip, an electrical connection to the nipple at a point outside of the jar, an insulating handle in conjunction with the nipple at a point outside of the jar, a vacuumizing connection to the jar, a valve in said connection, a gage in said connection between the valve and jar, there being an air passage through the nipple having its inner end in communication with the space within the jar, a valve controlling communication of the outer end of said passage with the atmosphere outside of the jar, and a gasket of resilient material surrounding the lower edge of the jar and adapted for contact with the surface of a can or the like, substantially as described.

2. An apparatus for vacuumizing and sealing cans and the like comprising in combination a transparent jar of gas-tight material having an opening therein, a flexible disk extending over said opening and having its peripheral portion in engagement with the jar around the opening in air-tight manner, a nipple extending through the disk, means for securing the nipple to the disk in air-tight manner, an electrode clip pivotally mounted on the inner end of the nipple means for securing said clip in a given position of adjustment, means for adjustably securing an electrode to said clip, an electrical connection to the nipple at a point outside of the jar, a vacuumizing connection to the jar, a valve in said connection, a gage in said connection between the valve and jar, and a gasket of resilient material surrounding the lower edge of the jar and adapted for contact with the surface of a can or the like, substantially as described.

3. An apparatus for vacuumizing and sealing cans and the like comprising in combination a transparent jar of gas-tight material having an opening in its side wall, a flexible disk extending over said opening and having its peripheral portion in air-tight connection with the jar, a nipple extending through the disk in air-tight manner, means for adjustably securing an electrode to the inner end of the nipple, a vacuumizing connection to the jar, a valve in said connection, a gage in said connection between the valve and jar, and a gasket of resilient material surrounding the lower edge of the jar and adapted for contact with the surface of a can or the like, substantially as described.

4. An apparatus for vacuumizing and sealing cans and the like comprising in combination a jar having an opening in its side wall, a flexible relatively flat disk extending over said opening and having its peripheral portion connected to the jar in air-tight manner, a nipple extending through said disk in air-tight manner, means for securing an electrode to the inner end of said nipple, a vacuumizing connection to the jar, and a valve in said connection, substantially as described.

5. An apparatus for vacuumizing and sealing cans and the like comprising in combination a jar having in its side wall a flexible air-tight partition, a nipple extending through said partition in air-tight manner, an electrode connected to the inner end of said nipple, and a vacuumizing connection to the jar, substantially as described.

6. An apparatus for vacuumizing and sealing cans and the like comprising in combination a jar having in its side wall a flexible partition of air-tight material and having its lower edge of resilient material adapted for contact with the surface of a can or the like, a nipple extending through said flexible partition, an electrode connected to the inner end of said nipple, an insulating handle in conjunction with the outer end of the nipple, and a vacuumizing connection to the jar, substantially as described.

7. An apparatus for vacuumizing and sealing cans and the like comprising in combination a jar having in its side wall a flexible partition of air-tight material and having its lower edge of resilient material adapted for contact with the surface of a can or the like, a nipple extending through said flexible partition, an electrode connected to the inner end of said nipple, and a vacuumizing connection to the jar, substantially as described.

GEORGE B. HAINES.